United States Patent [19]

Pilat

[11] 4,073,449
[45] Feb. 14, 1978

[54] APPLIANCE CORD REEL

[76] Inventor: Joseph Pilat, 69-29 54th Ave., Maspeth, N.Y. 11378

[21] Appl. No.: 687,937

[22] Filed: May 19, 1976

[51] Int. Cl.$^2$ ............................................. B65H 75/48
[52] U.S. Cl. ................................. 242/107.1; 191/12.4
[58] Field of Search ............................. 242/107, 107.1; 191/12.2 R, 12.4

[56] References Cited

U.S. PATENT DOCUMENTS

| 2,013,733 | 9/1935 | Murphy | 191/12.4 |
| 2,211,561 | 8/1940 | Flannelly | 242/107.1 |
| 2,521,226 | 9/1950 | Keller | 191/12.4 |
| 3,147,833 | 9/1964 | McWilliams | 191/12.4 |

FOREIGN PATENT DOCUMENTS

| 1,658,694 | 2/1923 | United Kingdom | 191/12.2 R |

*Primary Examiner*—Edward J. McCarthy
*Attorney, Agent, or Firm*—Robert D. Farkas

[57] ABSTRACT

This disclosure pertains to an appliance cord reel comprising an inner spring biased cord supporting rod about which a hollow cylinder having a slit spirally wound extending substantially the length thereof and an outermost hollow cylinder adapted with a slit extending parallel to the longitudinal axis thereof. A flexible electrical cable, adapted with a male plug that is secured to the outermost cylinder on a side opposite the longitudinal slot therein, passes onto the central rod and is wound about the rod. The other end of the cable passes through the spiral slot in the innermost cylinder and the longitudinal slot in the outermost cylinder, terminating in a receptacle extensible from the outermost surface of the outermost cylinder, when withdrawn from within, causing the innermost rod to rotate as the cord is unwound therefrom and causing the intermediate cylinder to rotate as the cord moves along the height thereof as it passes through the spirally wound slot.

5 Claims, 4 Drawing Figures

U.S. Patent  Feb. 14, 1978  4,073,449
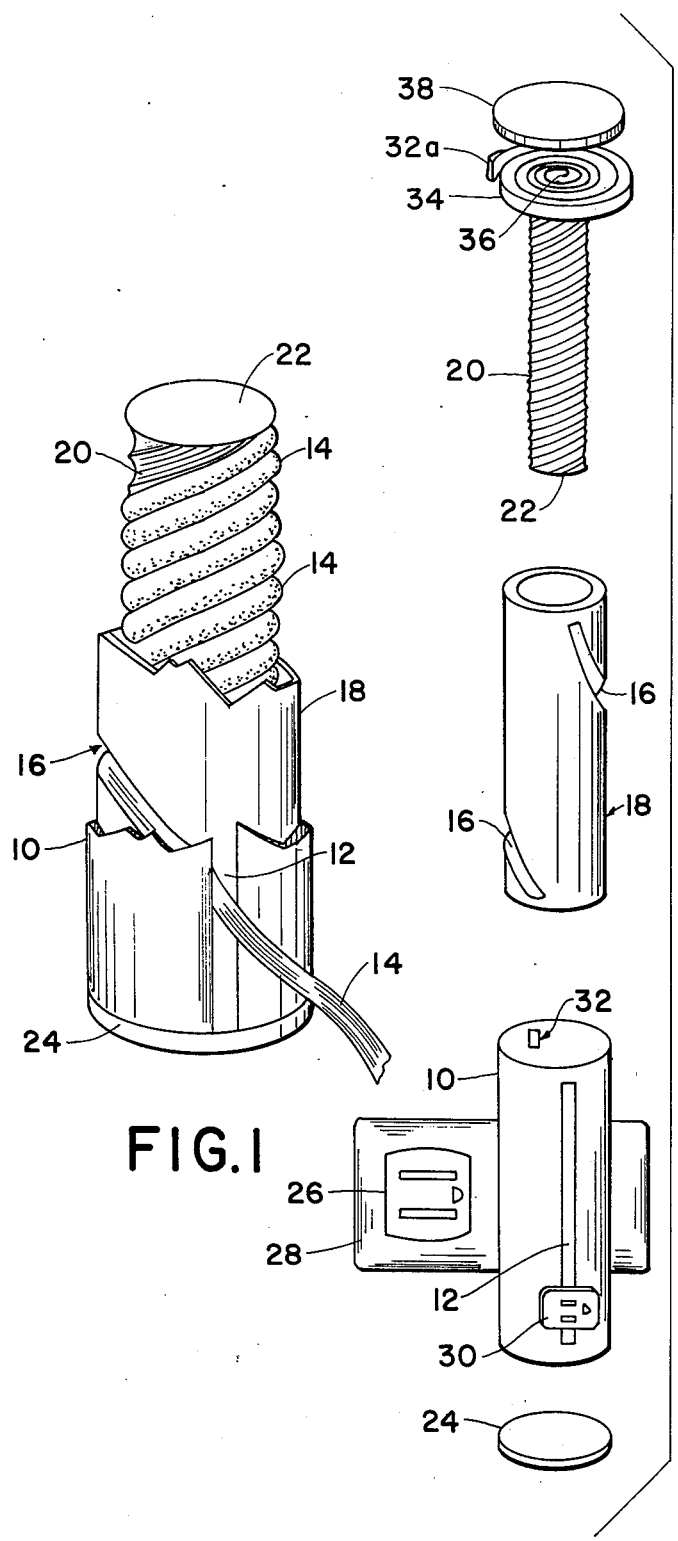
FIG.1
FIG.2
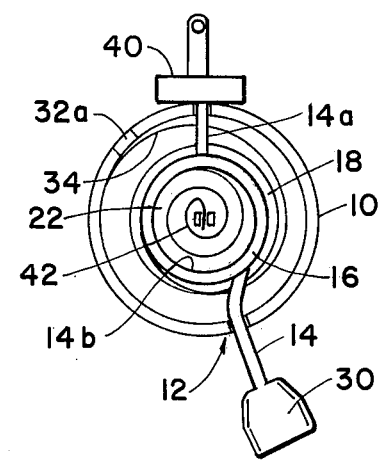
FIG.3
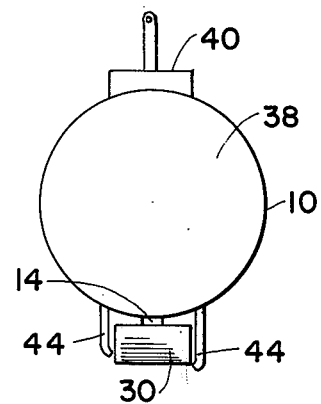
FIG.4

APPLIANCE CORD REEL

BACKGROUND OF THE INVENTION

1. The Field of the Invention

This invention relates to appliance cord reels and more particularly to that class adapted to be plugged into utility outlets secured within a wall opening or of the type which can be added to the outlet end of a flexible extension cord.

2. Description of the Prior Art

The prior art abounds with devices which employ a reel, rotatably biased by a spring, and adapted with a housing containing the reel and an extension cord stored thereon. U.S. Pat. No. 3,056,863 issued Oct. 2, 1962 to J. A. Johnson and U.S. Pat. No. 2,979,576 issued Apr. 1, 1961, to J. A. Huber and U.S. Pat. No. 2,976,374 issued Mar. 21, 1961 to R. E. Poulsen all teach a reel adapted to store a plurality of turns of an extension cord thereupon. The reel is rotatably journalled within a housing through which one end of the cord passes, having a receptacle fitted to the cord external to the outermost surface of the housing and the other end of the cord fitted to a male plug which is either rigidly secured to the outermost surface of the housing or flexibly connected thereto. All of the above devices suffer a common deficiency, in that the cord, when wrapped about the outer surface of the reel, assumes a random overlocking position rather than an orderly distribution, in touching engagement between adjacent turns, forming a single or multilayer of cord turns thereon.

SUMMARY OF THE INVENTION

A primary object of the present invention is to provide an appliance cord reel which stores the turns of the cord in successive touching turns in a single layer on the surface of a rod-like cord storage element.

Another object is to provide a means for removing and storing the cord turns in a proscribed distribution on the cord storage rod.

Still another object is to provide a slot through which the cord passes, minimizing thereby, cord wear occassioned by abrasion and extensive bending.

Yet another object is to provide an appliance cord reel which does not obliterate more than one outlet during use with a duplex outlet receptacle.

A further object is to provide an appliance cord reel which can be used with equal success in conjunction with a wall outlet receptacle and at the receptacle end of a flexible extension cord.

An outermost housing is provided, having a longitudinal slot extending the length of and parallel to the longitudinal axis of the right angle cylinder comprising it. A flexible electrical cable passes through the slot terminated in a receptacle extending without the cylinder and retractably drawn into the cylinder, passing through the slot. A concentric intermediate cylinder is rotatably secured within the outermost cylinder, having a less than single turn spirally wound slot passing through the innermost and outermost surfaces thereof and extending substantially the entire length of the intermediate cylinder. The cord passes from the surface of a rotatably, spring biased rod, housed within the intermediate cylinder, through the spiral slot in the intermediate cyinder, which serves as an unwinding and winding device, selectively disengaging and selectively distributing successive touching turns of the cord on the surface of the storage rod as the cord is withdrawn from and stored onto the surface of the rod. The novel cord distributing feature minimizes cord wear and tangling whilst insuring maximum utility of the storage space available, utilizing the intermediate cylinder in much the same fashion as a line distributing loop provides on fishing reels.

These objects, as well as other objects of the present invention, will become readily apparent after reading the following description of the accompanying drawings.

BRIEF DESCRIPTION OF THE DRAWINGS

FIG. 1 is a partial perspective view of the cord storage rod, intermediate cylinder, and outermost cylinder;

FIG. 2 is an exploded perspective view of the components of the instant invention including a wall mounted duplex receptacle and excluding the flexible cord;

FIG. 3 is a plan view of the appliance cord reel with the cover disc removed;

FIG. 4 is a plan view of the appliance cord reel showing a receptacle clamp.

DESCRIPTION OF THE PREFERRED EMBODIMENT

The structure and method of fabrication of the present invention is applicable to retractable electrical extension cords adapted with a male plug fixedly secured to the outermost surface of a right angle cylinder housing having a longitudinal slot disposed therein, substantially opposite the location of the male plug. An innermost cylindrical rod is rotatably journalled to the cylindrical housing having common coaxial axes. An intermediate cylinder is disposed within the housing, having an innermost surface displaced radially outwardly from the outermost surface of the cylindrical rod. A spiral spring biases the innermost rod in a clockwise direction when viewed from the end of the rod opposite the end from which an electrical line cord extends radially outwardly from the rod passing through an opening in the housing and terminating in a male plug. The balance of the cord is wrapped in a series of touching turns along a single layer upon the innermost cord storing rod so that the free end of the cord passes through a less than single turn spirally wound slot in the surfaces of the intermediate cylinder. The spirally wound slot extends substantially the entire length of the intermediate cylinder, serving as a freely turning cord distributing device, securing the outermost surfaces of the cord between the innermost surfaces of the cord between the innermost surfaces of the intermediate cylinder and the surfaces of a spirally wound cord engaging notch in the surface of the innermost rod. The cord, after passing through the spirally wound slot, proceeds through the longitudinal slot in the housing, terminating in a receptacle outlet, which may be conveniently stored or secured within a receptacle clamp fastened to the outermost surfaces of the housing adajcent the longitudinal slot therein, located at the end of the slot closest to the location of the male plug.

A spirally wound spring has one free end thereof secured to the wall of the housing and the other free end secured to one end of the rotatable cord storing rod. Two circular caps close the end openings in the cylindrical housing.

Now referring to the Figures, and more particularly to the embodiment illustrated in FIG. 1 showing the outermost housing 10 having a slot 12 therein. Cord 14 extends through the slot 12 and through a slot 16 in the intermediate cylinder 18. Cord 14 is shown secured within spirally wound notches 20 located in the cylindrical surface of rotatable cord storage rod 22. Cap 24 closes the lowermost opening of housing 10. The inside diameter of cylinder 18 extends in close proximity to the outermost surfaces of the portions of cord 14 that are wound about rod 22.

FIG. 2 illustrates lowermost cap 24 displaced downwardly from housing 10. A male plug, not shown, extending from the rearmost surface of housing 10, is inserted into the right hand receptacle, not shown, of the duplex receptacle 26, whose surfaces are partially concealed by cover plate 28 which is fastened to the receptacle and the wall, not shown, to which the duplex receptacle is secured. Extensible receptacle 30 is illustrated concealing a portion of the length of longitudinal slot 12. Opening 32 in housing 10 is utilized to engage end 32a of helically wound spring 34 therein. The spring 34 is adapted with an innermost end 36 which is non-rotatably secured to the uppermost end of cord storing rod 22, which is shown with a spirally wound notch 20 on its outermost cylindrical surface. Cap 38 engages the uppermost opening in housing 10, concealing spring 34, rod 22, cord 14, now shown, and intermediate cylinder 18, which is adapted with a spirally wound slot 16.

FIG. 3 illustrates the assembled plan view of the components shown in FIG. 1 with cap 38 removed, in plan view, as viewed from above. Male plug 40 is fixedly secured to the outermost surfaces of housing 10, having a length of cord 14a extending below intermediate cylinder 18, proceeding thence in wrap around fashion 14b onto the surface of rod 22, passing through slot 16 and slot 12 to the free portion 14 and terminated in receptacle 30. Spirally wound spring 34 is illustrated with end 32a passing through opening 32 at one end, engaging protrusions 42 at the other free end thereof.

FIG. 4 illustrates housing 10 covered with cap 38, in plan view. Plug 40 is illustrated on the opposite surface from exposed cord 14 and receptacle 30, which is shown in captured position by springs 44. Receptacle 30 may be removed from springs 44, when desired, and extended radially outwardly from housing 10 to the extent determined by the length of cord 14, not shown, stored within the housing.

One of the advantages that the preferred embodiment provides is an appliance cord reel which stores the turns of the cord in successive touching turns in a single layer on the surface of a rod-like cord storage element.

Another advantage that the preferred embodiment provides is a means for removing and storing the cord turns in a proscribed distribution on the cord storage rod.

Still another advantage is provided by a slot through which the cord passes, minimizing thereby, cord wear occassioned by abrasion and extensive bending.

Yet another advantage that the preferred embodiment provides is an appliance cord reel which does not obliterate more than one outlet during use with a duplex outlet receptacle.

A further advantage that the preferred embodiment provides is an appliance cord reel which can be used with equal success in conjunction with a wall outlet receptacle and at the receptacle end of a flexible extension cord.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited not by specific disclosure herein, but only by the appending claims.

I claim:

1. An appliance cord reel comprising cord mounting means for distributing turns of said cord in touching engagement to adjacent turns of said cord about an external surface of said cord mounting means, cord distributing means for disposing selective portions of said cord about said surface, housing means enclosing said cord distributing means and said cord mounting means, said cord passing through an opening in said housing means terminating in a receptacle and passing through another opening in said housing means terminating in a plug, said receptacle extending outwardly from said opening and biased inwardly by spring bias means acting upon said cord mounting means, said cord distributing means including a hollow right angle cylinder, said hollow right angle cylinder housing a spirally wound slot located in the cylindrical surfaces thereof, said slot extending substantially along the entire length of said hollow right angle cylinder and having an angular displacement about the longitudinal axis of said hollow right angle cylinder limited to a maximum of 360°, said longitudinal axis of said hollow right angle cylinder co-axially aligned with the longitudinal axis of said external surface of said cord mounting means, said cylindrical surfaces of said hollow right angle cylinder being disposed rotatable about the longitudinal axis thereof relative to said external surface of said cord mounting means.

2. The appliance cord reel as claimed in claim 1 wherein said cord mounting means comprises a cylindrical rod rotatably secured within said housing and having a spirally wound notch in the cylindrical surface of said rod for engaging said turns therein.

3. The appliance cord reel as claimed in claim 1 wherein said housing means comprises an external hollow right angle cylinder having a longitudinal slot extending substantially the entire length of said external hollow right angle cylinder, two circular discs removably affixed to the openings in said external hollow right angle cylinder.

4. The appliance cord reel as claimed in claim 1 wherein said spring bias means comprises a spirally wound spring, one end of said spring fixedly secured to said housing means, the other end of said spring fixedly secured to said cord mounting means, said cord mounting means biased upon rotation thereof by said spring.

5. The appliance cord reel as claimed in claim 2 further comprising a hollow right angle cylinder having a spirally wound slot located in the cylindrical surfaces thereof, said slot extending substantially along the entire length of said hollow right angle cylinder and having an angular displacement about the longitudinal axis of said hollow right angle cylinder limited to a maximum of three hundred and sixty degrees, an external hollow right angle cylinder having a longitudinal slot extending substantially the entire length of said external hollow right angle cylinder, two circular discs removably affixed to the openings in said external hollow right angle cylinder, a spirally wound spring, one end of said spring fixedly secured to said housing means, the other end of said spring fixedly secured to said cord mounting means, said cord mounting means biased upon rotation thereof by said spring.

* * * * *